United States Patent Office 3,358,708
Patented Dec. 19, 1967

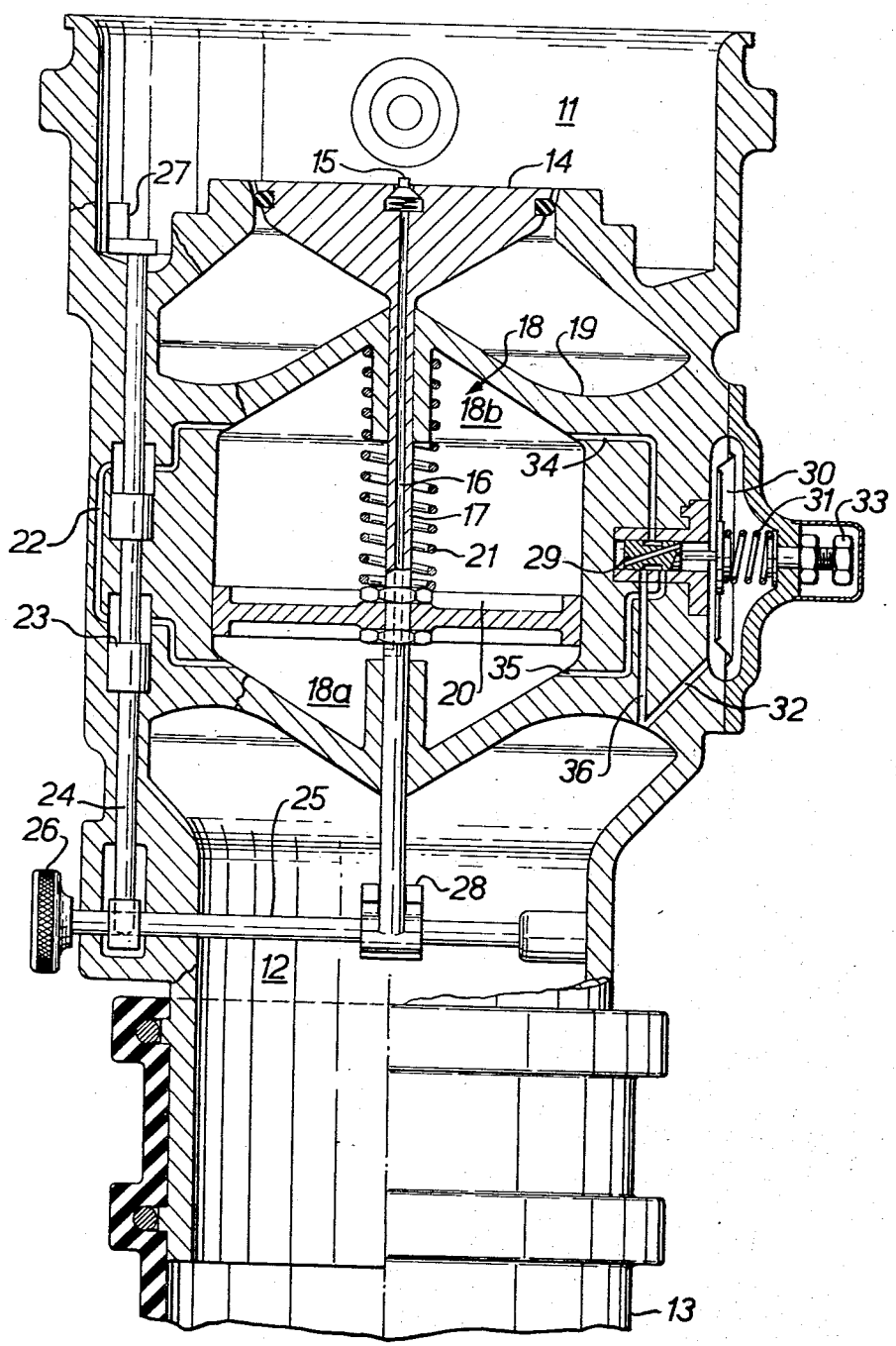

3,358,708
COUPLING DEVICES FOR PIPES OR CONDUITS
Peter Gillingham Williams, London, England, assignor to The British Petroleum Company Limited, London, England, a corporation of England
Filed May 13, 1964, Ser. No. 367,024
Claims priority, application Great Britain, June 5, 1963, 22,314/63
8 Claims. (Cl. 137—495)

The present invention relates to coupling devices for pipes or conduits, of the kind in which first and second coupling parts are provided respectively with first and second valve members which close the passages through the respective coupling parts when those parts are separated, the valve members when they are closed and the parts brought together for coupling being substantially in contact with each other so that there is no considerable space between them.

It relates particularly to coupling devices in which the movement of the second valve member upon closure of its respective passage is in the same direction as that of the fluid flow prior to separation.

Such coupling devices are known in which the connecting together of the coupling parts and the opening of the valve members is effected in a continuous operation.

In one such known coupling device the coupling parts are interengaged by turning movement of one with respect to the other and cam means controlled by the turning movement are utilised for opening the valves.

With such coupling devices it is possible to couple pairs of pipes or conduits, one pipe or conduit of which contains a fluid flowing under pressure, with very little spillage of fluid during coupling and uncoupling.

One disadvantage of the known devices is that when pipes being coupled contain fluid under pressure (e.g., four-inch pipe at 120 p.s.i.g.) a considerable amount of physical effort is required to provide the turning movement to actuate the cam means for opening the valves against the fluid pressure.

It is accordingly an object of the present invention to provide a coupling device which overcomes the above mentioned disadvantage.

It is a further object of the present invention to provide a coupling device in which the valve members act as a pressure and flow control device.

According to the present invention we provide a coupling device for pipes or conduits which comprises first and second coupling parts provided respectively with first and second valve members, the coupling parts when brought together, in use, being adapted to provide a small fluid connection between them, the fluid connection being provided by means of a passage which allows the fluid to flow from the first coupling part into the second coupling part, interengagement of the two coupling parts causing the second valve member to be moved from its closed to its open position, the energy therefor being provided by the pressure of the fluid in the first coupling part, the movement of the second valve member moving the first valve member from its closed to its open position by direct contact.

The fluid flows through the passage into a first end of a piston chamber contained in the second coupling part to move a piston contained therein.

Conveniently, the fluid connection is provided by respective first and second passages formed in the first and second valve members, first and second auxiliary valve members being provided respectively in the first and second passages which auxiliary valve members co-operate to open their respective passages upon the bringing together of the two coupling parts.

An interconnecting passage may be provided normally interconnecting the first end of the piston chamber to the other (second) end on the other side of the piston so allowing fluid flow such as to equalise the pressure, in use, on either side of the piston to render it inoperative, manually operable means being operable to cause means, for example a spool valve, to close said interconnecting passage to render the piston operative.

The manually operable means may also be mechanically coupled, for example by a cam to the second valve member such that in the normal position of the manually operable means the second valve member is locked in its closed position and in the operable position the second valve member is released so as to be movable to its open position.

The manually operable means may further be mechanically coupled to an interlock arrangement which causes the two coupling parts to be locked in interengagement, in use, upon operation of the manually operable means.

An automatic control arrangement may be provided arranged such that when the pressure at the output end of the second coupling part is below a first predetermined pressure the second end of the piston chamber is connected to exhaust into the output end of the second coupling part to allow the piston to be operable; when the pressure at the output end of the second coupling part is above a second predetermined pressure the first and second ends of the piston chamber are interconnected to prevent movement of the piston towards its operative position, and when the pressure at the output end of the second coupling part is between said predetermined pressures said first end of the piston chamber is connected to exhaust into the output end of the second coupling part by varying amounts to vary the position of the piston such that the rate of flow past the two valve members is maintained at a predetermined value.

The control arrangement may comprise a spool valve which interconnects respective passages to the first and second ends of the piston chamber and to the output end of the second coupling part under control of pressure responsive means responsive to the output pressure of the second coupling part.

According to a further aspect of the present invention we provide a coupling part for use in a coupling device for pipes or conduits, which coupling part has any one of, a combination of, or all of the features of the second coupling part described above.

More specifically, we provide a coupling part comprising a valve member having a passage formed therein, an auxiliary valve member in the passage, a piston fixedly coupled to the valve member, and capable of moving in a piston chamber to one end of which the passage has access, and a closable interconnecting passage between the ends of the piston chamber on either side of the piston.

The first coupling part herein referred to may be of the type in which a valve member acts against a spring, the valve member incorporating an auxiliary valve member, which when brought into direct contact with the valve member of the second coupling part, allows fluid to flow from the first to the second coupling part via the auxiliary valve members of the first and second coupling parts. The flow of fluid actuates the valve member of the second coupling part, which in turn actuates the valve member of the first coupling part.

In order that the invention can be more clearly understood a specific embodiment thereof will hereinafter be described, by way of example only, with reference to the drawing which shows a diagrammatic representation of a pipe or conduit coupling part.

Referring now to the drawing there is shown a generally cylindrical coupling part which is formed at its end 11 for interengagement with a complementary coupling part (not shown). The other end 12 of the coupling part is shown connected to a length of hose 13. The coupling is constructed for use in a fluid system in which the direction of fluid flow is from end 11 towards end 12.

Flow through the coupling is controlled by a circular valve member 14 shown in its closed position. An auxiliary valve member 15, carried by valve member 14, controls the flow through a passage 16 in valve stem 17. Valve stem 17 is slidably mounted through a generally cylindrical piston chamber 18 which is mounted coaxially within the coupling on a web 19. A piston 20 is fixed to valve stem 17 for sliding movement along piston chamber 18, the valve member 14 being retained in its closed position by a light compression spring 21 positioned between the piston 20 and the end of the piston chamber 18 nearest valve member 14. Passage 16 opens into piston chamber 18 at its side 18a remote from valve member 14.

A passage 22 is provided in web 19 which passage interconnects the side 18a of piston chamber 18 to its side 18b on the other side of piston 20. The passage 22 is opened and closed under control of a spool valve 23 actuated via spindle 24 and spindle 25 by rotation of a manually operable knob 26.

An extension of spindle 24 above spool valve 23 terminates in the form of an interlocking arrangement 27 which is formed to cooperate with a complementary coupling part (not shown) to lock the two coupling parts in interengagement when knob 26 is actuated to move spool valve 23 from its open to its closed position.

Valve stem 17 is linked via cam means 28 with spindle 25 such that actuation of knob 26 to move spool valve 23 from its open to its closed position causes cam means 28 to move from a position in which valve stem 17 is locked to prevent valve member 14 from opening to a position in which valve stem 17 may move to open valve member 14.

A further spool valve 29 is provided in web 19 which is actuated by diaphragm 30 of a pilot valve 31 whose movement is controlled by the pressure of output end 12 of the coupling part, the diaphragm 30 and end 12 being interconnected by a passage 32. Manual adjustment of pilot valve 31 is achieved by rotation of nut 33.

Spool valve 29 controls the interconnection of a passage 34 from side 18b of piston chamber 18, a passage 35 from side 18a of piston chamber 18, and passage 36 from output end 12 of the coupling part.

Valve 29 may also be actuated by a direct linkage with a lever whose positioned is determined by the fluid flow. This lever may replace or supplement the diaphragm control of valve 29.

In operation the coupling part is interengaged with a complementary coupling part at end 11. Interengagement causes auxiliary valve member 15 and a complementary auxiliary valve (not shown) in the complementary coupling part to open and fluid flows through passage 16 to side 18a of chamber 18 and then via passage 22 to side 18b of chamber 18. Hence the pressures on each side of piston 20 are substantially equal and the piston is not actuated.

Knob 26 is then rotated to actuate the locking arrangement 27 for locking the two coupling parts in correct interengagement, to cause cam means 28 to release valve stem 17 and to move spool valve 23 to close passage 22. Fluid now flows under pressure into end 18a of chamber 18 via passage 16 and piston 20 is moved along chamber 18 so causing valve member 14 to open. This condition only obtains when the pressure in output end 12 of the coupling part, and hence the pressure on diaphragm 30, is below a predetermined value, the spool valve being in a position to connect end 18b of chamber 18, to output end 12 of the coupling part via passages 34 and 36 to allow an exhaust of end 18b of chamber 18.

As valve member 14 opens fluid flows through the main aperture of the coupling part around the web 19 and out of output end 12. Hence as the valve opens the flow gradually increases and the pressure at the output end 12 of the coupling part increases so causing the pressure on the diaphragm 30 to increase. This increase of pressure causes diaphragm 30 to move to the right with a corresponding movement of spool valve 29. Spool valve 29 moving to the right reached a predetermined intermediate position (as shown on drawing) at which side 18a of chamber 18 is connected to outlet end 12 of the coupling part via passages 35 and 36. At a predetermined pressure on diaphragm 30 an equilibrium state is reached and there is no further movement of piston 20.

A build up of pressure to a value above a predetermined maximum causes the spool valve 29 to move further to the right and sides 18a and 18b of chamber 18 are interconnected via passages 34 and 35. In this condition the fluid pressure on valve member 14 and the pressure of spring 21 causes it to tend to close until the pressure at output end 12 falls to the required value and spool valve 29 returns to its intermediate position.

When it is required to uncouple the device the knob 26 is returned to its initial position, passage 22 opens and valve member 14 returns to its closed position due to the fluid pressure on its complementary valve member in the other coupling part, plus the pressure exerted by spring 21; valve spindle 17 is locked by cam means 28; and the interlocking arrangement 27 is released. The coupling parts are then disengaged from one another.

It can be seen from the above that no physical effort is employed in actually opening the valve members against the fluid pressure and that pressure and flow control is provided utilising the main valve member.

Coupling parts as herein described are particularly suitable for connecting four inch hoses to complementary hydrants in a hydrant system for refueling aircraft.

I claim:

1. A coupling device for pipes or conduits comprising, a coupling member provided with a valve member having a first passage containing an auxiliary valve member therein, a piston mechanically coupled to said valve member, fluid pressure equalizing means for equalizing the pressure on either side of said piston, and manually operable means to inactivate said fluid pressure equalizing means, said manually operable means being mechanically coupled to said valve member, said valve member adapted to move from a closed to an open position in a direction opposite to that of the fluid flow through the coupling member, movement of said valve member being caused by fluid flowing only through said first passage into said coupling member as a result of mechanical pressure applied to said auxiliary valve member so as to cause it to move from a closed to an open position, the pressure of the fluid flowing through said first passage moving said piston when said manually operable means is operated to inactivate said fluid pressure equalizing means, said movement of said piston causing said valve member to move to said open position.

2. A coupling device as claimed in claim 1, wherein said valve member is mechanically locked in the closed position when the fluid pressure equalizing means is operated.

3. A coupling device as claimed in claim 1, wherein said manually operable means is coupled to said valve member by cam means.

4. A coupling device for pipes or conduits comprising, a coupling member provided with a valve member having a first passage containing an auxiliary valve member therein, a piston mechanically coupled to said valve member, a second passage connecting both sides of said piston, said second passage providing means for equalizing pressure on either side of said piston, manually operable means operable to close said second passage and also mechanically coupled to said valve member, said valve member being movable from a closed to an open position in a direction opposite to that of fluid flow through the coupling member, movement of said valve member being caused by fluid flowing only through said first passage into the coupling member as a result of mechanical pressure applied to the auxiliary valve member so as to cause it to move from a closed to an open position, the pressure of the fluid flowing through said first passage moving said piston when said manually operable means is operated to close said second passage, the movement of said piston causing said valve member to move to said open position.

5. A coupling device as claimed in claim 4, wherein said manually operable means includes a spool valve.

6. A coupling device for pipes or conduits comprising, a coupling member provided with a valve member having a first passage containing an auxiliary valve member therein, a piston mechanically coupled to said valve member, fluid pressure equalizing means for equalizing the pressure on either side of said piston, manually operable means operable to inactivate said fluid pressure equalizing means and also mechanically coupled to said valve member, and control means responsive to the output fluid pressure of the coupling member, said valve member being movable from a closed to an open position in a direction opposite to that of the fluid flow through the coupling member, said movement of said valve member being caused by fluid flowing only through said first passage into the coupling member as a result of mechanical pressure applied to the auxiliary valve member so as to cause it to move from a closed to an open position, the pressure of the fluid flowing through said first passage moving said piston when said manually operable means is operated to inactivate said fluid pressure equalizing means, said movement of said piston causing said valve member to move to said open position.

7. A coupling device for pipes or conduits comprising, a coupling member provided with a valve member having a first passage containing an auxiliary valve member therein, a piston mechanically coupled to said valve member, a second passage connecting both sides of said piston, said second passage providing means for equalizing pressure on either side of said piston, a spool valve operable to close said second passage connecting both sides of said piston, means mechanically coupling said spool valve to said valve member, and a pressure-responsive diaphragm adapted to control the fluid pressure on said piston, said valve member being movable from a closed to an open position in a direction opposite to that of the fluid flow through the coupling member, movement of said valve member being caused by fluid flowing only through said first passage into the coupling member as a result of mechanical pressure applied to the auxiliary valve member so as to cause it to move from a closed to an open position, the pressure of the fluid flowing through said first passage moving said piston when the spool valve is operated to close said second passage, said movement of said piston causing said valve member to move to said open position.

8. A coupling device as claimed in claim 7, wherein said diaphragm controls an additional spool valve situated in a passage connecting both sides of said piston and also connecting the side of the piston nearer the input end of the coupling member and the output end thereof, said diaphragm causing both sides of said piston to be interconnected when the pressure at the output end of the coupling member is above a first predetermined amount, and causing the side of said piston farthest from the input end of the coupling member to be connected to the output end of the coupling member when the pressure at the output end is between a second predetermined pressure and said first predetermined pressure, the connection between said side of said piston farthest from the input end of the coupling member and the output end thereof being so arranged that the pressure at the output end is maintained substantially at a predetermined value.

References Cited
UNITED STATES PATENTS

| 3,055,405 | 9/1962 | Pase | 141—207 |
|---|---|---|---|
| 3,174,508 | 3/1965 | Zahuranei | 137—614.04 |
| 3,215,161 | 11/1965 | Goodwin et al. | 137—614.04 |

WILLIAM F. O'DEA, *Primary Examiner.*

H. M. COHN, *Assistant Examiner.*